US012701189B2

(12) United States Patent
Xiao-Devins et al.

(10) Patent No.: US 12,701,189 B2
(45) Date of Patent: Aug. 4, 2026

(54) IDENTIFYING A VOICEMAIL MESSAGE AS SPAM BASED ON A SIMILARITY TO A SPAM MESSAGE

(71) Applicant: Zoom Communications, Inc., San Jose, CA (US)

(72) Inventors: Melinda Min Xiao-Devins, San Jose, CA (US); Haifeng Geng, San Jose, CA (US); Mengxiao Qian, Santa Clara, CA (US); Fengcai Sun, Hangzhou (CN); Hui Wen, Hangzhou City (CN)

(73) Assignee: Zoom Communications, Inc., San Jose, CA (US)

( * ) Notice: Subject to any disclaimer, the term of this patent is extended or adjusted under 35 U.S.C. 154(b) by 288 days.

(21) Appl. No.: 18/646,213

(22) Filed: Apr. 25, 2024

(65) Prior Publication Data

US 2024/0275886 A1      Aug. 15, 2024

Related U.S. Application Data

(63) Continuation of application No. 17/191,668, filed on Mar. 3, 2021, now Pat. No. 12,003,671.

(30) Foreign Application Priority Data

Jan. 29, 2021      (CN) .......................... 202110127306.3

(51) Int. Cl.
H04M 3/533 (2006.01)
H04M 1/663 (2006.01)
H04M 3/436 (2006.01)

(52) U.S. Cl.
CPC ....... H04M 3/53366 (2013.01); H04M 1/663 (2013.01); H04M 3/436 (2013.01); H04M 3/5335 (2013.01)

(58) Field of Classification Search
CPC .. H04M 3/53366; H04M 1/663; H04M 3/436; H04M 3/5335; H04M 2201/40; H04L 51/18; G10L 25/51
See application file for complete search history.

(56) References Cited

U.S. PATENT DOCUMENTS 7,222,157 B1      5/2007  Sutton, Jr. et al.
7,475,118 B2      1/2009  Leiba et al.
(Continued)

OTHER PUBLICATIONS https://www.youmail.com/home/feature/call-blocker, Call Blocker | YouMail, Call Blocker, Block Spammers, telemarketers and unwanted calls forever, 5 pages, 2021.
(Continued)

*Primary Examiner* — Ankur Jain
(74) *Attorney, Agent, or Firm* — Young Basile Hanlon & MacFarlane, P.C.

(57) ABSTRACT

Voicemail spam detection is performed based on content of voicemail messages. The content of an incoming voicemail message is compared to a spam template that includes a representation of a spam voicemail. Spam templates may be generated based on spam indications provided by users for voicemail messages they have received. User indications for sufficiently similar voicemail messages may be aggregated by maintaining a vote count for a spam template that reflects how many times a user has indicated a matching voicemail message is spam. A spam template may also include an occurrence count that reflects how many times voicemail messages matching a spam template have been detected in a telephony system. An incoming voicemail message may be compared to spam templates and, responsive to a match of content and/or a corresponding vote count or occurrence count meeting a condition, the voicemail message may be identified as spam.

17 Claims, 8 Drawing Sheets

(56) References Cited

U.S. PATENT DOCUMENTS

| | | | |
|---|---|---|---|
| 7,680,890 | B1 | 3/2010 | Lin |
| 7,860,928 | B1 | 12/2010 | Anderson |
| 8,051,134 | B1 | 11/2011 | Begeja et al. |
| 9,519,682 | B1 | 12/2016 | Pujara et al. |
| 10,606,850 | B2 | 3/2020 | Crudele et al. |
| 10,699,246 | B2 | 6/2020 | Wieneke et al. |
| 10,979,464 | B1 | 4/2021 | Lang et al. |
| 11,651,032 | B2 * | 5/2023 | Jayaraman .............. G06F 40/30 |
| | | | 706/12 |
| 2002/0116463 | A1 | 8/2002 | Hart |
| 2004/0128355 | A1 | 7/2004 | Chao et al. |
| 2004/0177110 | A1 | 9/2004 | Rounthwaite et al. |
| 2004/0215793 | A1 | 10/2004 | Ryan et al. |
| 2004/0267893 | A1 | 12/2004 | Lin |
| 2005/0060638 | A1 | 3/2005 | Mathew et al. |
| 2005/0080856 | A1 | 4/2005 | Kirsch |
| 2005/0080857 | A1 | 4/2005 | Kirsch et al. |
| 2005/0097435 | A1 | 5/2005 | Prakash et al. |
| 2005/0160148 | A1 | 7/2005 | Yu |
| 2005/0165895 | A1 | 7/2005 | Rajan et al. |
| 2005/0262209 | A1 | 11/2005 | Yu |
| 2006/0026242 | A1 | 2/2006 | Kuhlmann et al. |
| 2007/0071200 | A1 | 3/2007 | Brouwer |
| 2007/0076853 | A1 | 4/2007 | Kurapati et al. |
| 2007/0133757 | A1 | 6/2007 | Girouard et al. |
| 2007/0150773 | A1 | 6/2007 | Srivastava |
| 2008/0123823 | A1 * | 5/2008 | Pirzada ............... H04M 3/5335 |
| | | | 379/88.19 |
| 2008/0144783 | A1 | 6/2008 | Kumar et al. |
| 2008/0155036 | A1 * | 6/2008 | Pirzada ................ H04L 51/212 |
| | | | 709/206 |
| 2008/0201651 | A1 | 8/2008 | Hong et al. |
| 2009/0147930 | A1 | 6/2009 | Rice |
| 2010/0153107 | A1 | 6/2010 | Kawai |
| 2012/0167208 | A1 | 6/2012 | Buford et al. |
| 2012/0324019 | A1 | 12/2012 | Ordogh |
| 2013/0136245 | A1 | 5/2013 | Reyes et al. |
| 2015/0350399 | A1 | 12/2015 | Feller |
| 2017/0005962 | A1 * | 1/2017 | Lewin-Eytan ........ H04L 51/212 |
| 2018/0131799 | A1 | 5/2018 | Kashimba et al. |
| 2018/0159808 | A1 | 6/2018 | Pal et al. |

OTHER PUBLICATIONS

How to Prevent Spam Callers From Leaving Voicemail, Josh Kirschner, 12 pages, Jul. 15, 2019.

GloVe: Global Vectors for Word Representation, Jeffrey Pennington, Richard Socher, Christopher D. Manning, Computer Science Department, Stanford University, Stanford, CA 94305, 12 pages. Jan. 2014.

Mature, Inc., Stop Robocalls and Spam Calls with Mutare's Innovative Voice Spam Filter Solution for Business, 3 pages, Sep. 17, 2020.

https://blog.zoom.us/ucaas-platform-whats-new-for-meetings-phone-webinar-zoomtopia-2020/, UCaaS Platform: What's New for Meetings, Phone & Webinar, 7 pages, Oct. 14, 2020.

A Voice spam Filter to Clean Subscribers' Mailbox, Seyed Amir Iranmanesh, Hemant Sengar, and Haining Wang, Department of Computer Science, College of William and Mary, Williamsburg, VA 23187, and Technology Development Department, VoDaSec Solutions, Fairfax, VA 22030, 18 pages, Jan. 2013.

https://support.google.com/voice/thread/78428232?hl=en, What does the Spam Filter Setting do as far as Calls?—Google Voice Community, 2 pages, Oct. 22, 2020.

* cited by examiner

700

702

APPLY SPEECH RECOGNITION MODULE TO VOICEMAIL MESSAGE TO OBTAIN TEXT TRANSCRIPT REPRESENTING VOICEMAIL MESSAGE

704

INPUT TEXT TRANSCRIPT TO LANGUAGE MODEL TO OBTAIN WORD VECTOR(S) REPRESENTING VOICEMAIL MESSAGE

706

COMPARE WORD VECTOR(S) REPRESENTING VOICEMAIL MESSAGE TO WORD VECTOR(S) OF SPAM TEMPLATE

IDENTIFYING A VOICEMAIL MESSAGE AS SPAM BASED ON A SIMILARITY TO A SPAM MESSAGE

CROSS-REFERENCE TO RELATED APPLICATION(S)

This application is a continuation of U.S. patent application Ser. No. 17/191,668, filed Mar. 3, 2021, which claims priority to and the benefit of Chinese Patent Application Serial No. 202110127306.3, filed Jan. 29, 2021, the entire disclosures of which are hereby incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for voicemail spam detection.

One aspect of this disclosure is a method that includes receiving a first voicemail message; comparing the first voicemail message to a voicemail representation of a spam template, wherein the spam template includes the voicemail representation and a vote count that reflects a number of times that one or more users have indicated that a voicemail message matching the voicemail representation is spam; comparing the vote count of the spam template to a first threshold; responsive to a match between the first voicemail message and the voicemail representation of the spam template and to the vote count exceeding the first threshold, identifying the first voicemail message as spam; and, responsive to identifying the first voicemail message as spam, invoking a spam mitigation measure on the first voicemail message.

One aspect of this disclosure is a system that includes a processor, and a memory, wherein the memory stores instructions executable by the processor to: receive a first voicemail message; compare the first voicemail message to a voicemail representation of a spam template, wherein the spam template includes the voicemail representation and a vote count that reflects a number of times that one or more users have indicated that a voicemail message matching the voicemail representation is spam; compare the vote count of the spam template to a first threshold; and, responsive to a match between the first voicemail message and the voicemail representation of the spam template and to the vote count exceeding the first threshold, identify the first voicemail message as spam.

One aspect of this disclosure is a method that includes receiving a first voicemail message; applying a speech recognition module to the first voicemail message to obtain a text transcript based on the first voicemail message; inputting the text transcript to a language model to obtain one or more word vectors representing the first voicemail message; comparing the one or more word vectors representing the first voicemail message to one or more word vectors of a spam template, wherein the spam template includes the one or more word vectors representing a voicemail; based on the comparison of the word vectors, identifying the first voicemail message as spam; and, responsive to identifying of the first voicemail message as spam, invoking a spam mitigation measure on the first voicemail message.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
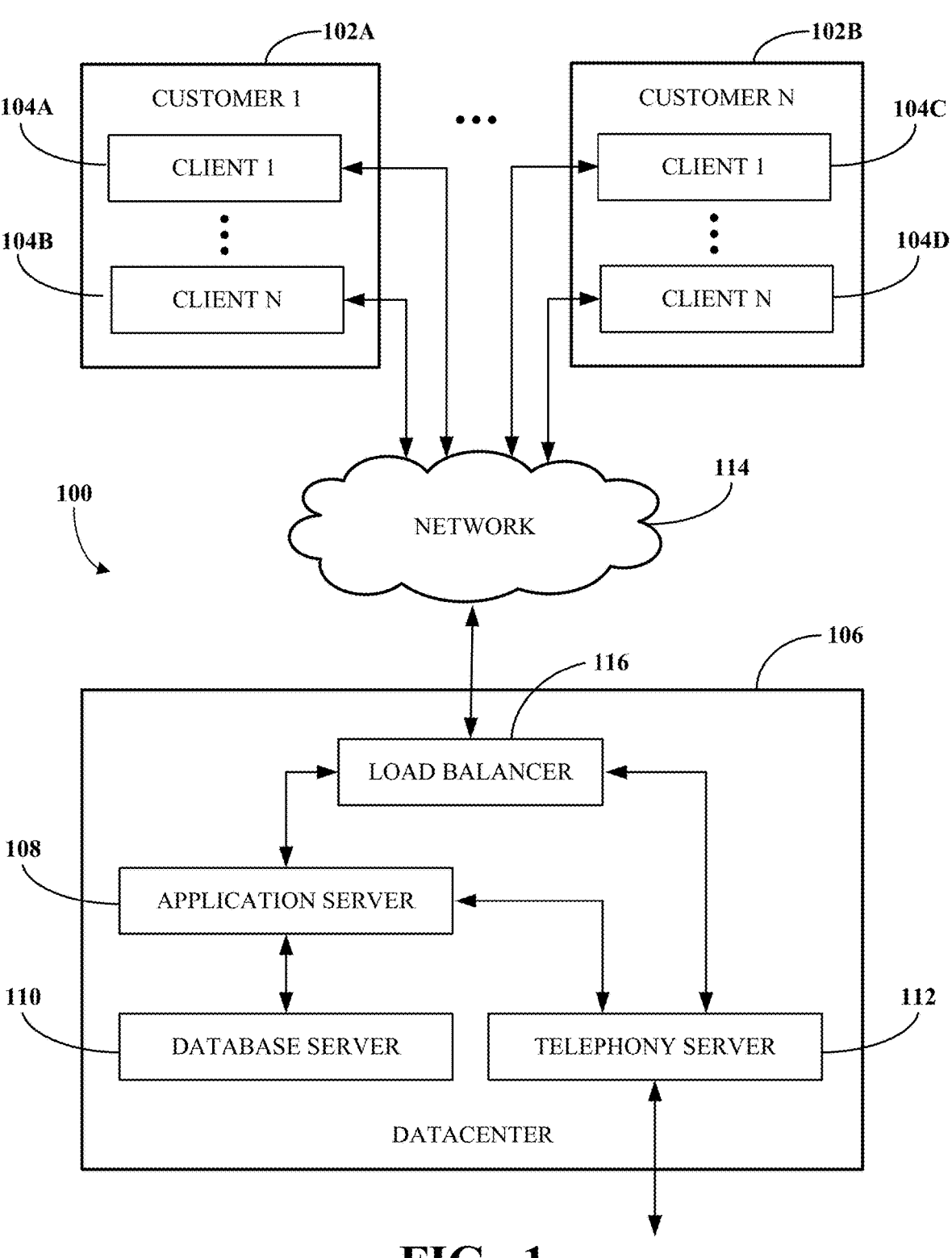
FIG. 1 is a block diagram of an example of an electronic computing and communications system.

Spam phone calls have proliferated in recent years. In 2017, 2.7% of all phone calls in the US were spam calls. In 2019, spam calls were increased to 40% of all calls in the US. Because of increasing spam calls, fewer people are answering calls from unknown callers, thus the calls go straight to voicemail. In addition, most call blocking services and apps bypass the phone ring and deflect the calls to the voicemail. Therefore, detecting spam voicemail has become important for phone service providers.

Most existing systems for spam call detection operate by detecting phone numbers that have been associated with spam (e.g., to a blocked caller list for an individual or an organization). Spam callers can often circumvent these spam blockers by often changing the telephone number that they use to place the spam calls. Many of the existing systems divert calls identified as spam directly to voicemail, which can fill up a user's voicemail inbox with spam messages. These problems have been exacerbated by the advent of robocaller software that automates the distribution of spam messages through the telephony network.

Implementations of this disclosure address problems such as these by detecting spam voicemail messages based on their content. Given that the majority of spam voicemails are broadcasted recording messages, the repetition and broadcasted count may become strong characteristics to determine whether a voicemail is a spam. A system is described herein in which: first users mark a voicemail as spam. A backend server collects the total spam votes from all users and builds a spam template list, where a respective spam template includes a representation of the content of a spam voicemail message that can be compared to future incoming voicemail messages. A spam template may also include a vote count that reflects how many users have flagged a voicemail message matching the spam template as spam. In some implementations, a spam template may also include an occurrence count that reflects how many voicemail messages matching the spam template have been detected by a telephony system. For an incoming new voicemail, a telephony server may compare the content of the incoming voicemail message with the spam templates. For example, if the new voicemail is highly similar with any spam template, and the users' collective vote count of the spam template exceeds a max threshold, the new voicemail may be identified as spam.

Various techniques may be employed to compare the content of a voicemail message to a spam template. For example, a speech recognition module may be applied to the audio signal of a voicemail message to obtain a text transcript representation of the voice mail message and this text transcript may be compared to a comparable representation of voicemail that is stored in a spam template. In some implementations, a text transcript of a voicemail message may be further converted to one or more word vectors using a natural language model to facilitate comparison. For example, one or more word vectors (e.g., word embedding vectors) representing an incoming voicemail message may be compared (e.g., using cosine similarity) to one or more word vectors stored in a spam template. In some implementations, an audio signal of an incoming voicemail message may be compared (e.g., using a distance metric such as mean square error or using a bit difference between corresponding audio fingerprints) to an audio signal stored in a spam template.

When a voicemail message is identified as spam, one or more spam mitigation measures may be applied to the voicemail message. For example, a spam mitigation measure may include marking the voicemail message as potential spam. For example, a spam mitigation measure may include blocking the voicemail message from entering a voicemail inbox of a user. For example, a spam mitigation measure may include deleting the voicemail message. For example, a spam mitigation measure may include displaying a message in a user interface indicating that the voicemail message is spam.

Implementations using aggregation of user indications of spam with vote counts for spam templates may utilize three tools: spam template collector, and spam filter, and spam adjuster.

For example, when a user marks a voicemail as spam, the spam template collector may store the spam message and increment the vote count. As a result, the spam template collector builds a spam template list that contains a representation of the spam voicemail message and its vote count (e.g., how many times the users mark the voicemail as spam). For example, a spam template collector may implement the technique 500 of FIG. 5.

For example, the spam template filter may be configured to, for every incoming voicemail message, compare the new voicemail with the spam template list. If the new voicemail is highly similar to any of the spam templates, the decision may depend on the following. If the spam template vote count<minimum vote threshold, the new voicemail is determined to not be a spam. If the spam template vote count>maximum vote threshold, the new voicemail is determined to be a spam. If the spam template vote count is between the min and max vote threshold, it may depend on the spam template occurrence count (e.g., reflecting the number of times the voicemail has been delivered in the telephony system). If the occurrence exceeds the occurrence threshold, the new voicemail is determined to be spam. Otherwise, the new voicemail is determined to not be spam. For example, a spam template filter may be configured to implement the technique 600 of FIG. 6.

A problem of a voting system may be that the voicemail receiver's personal opinion is overpowered by the collective votes. For example, a recorded and broadcasted call may be considered by most users as spam, but may not be spam for a particular receiver. In some implementations, a receiver may correct a telephony system's decision by marking a voicemail message as a non-spam message. For example, a spam adjustor may be configured to not only decrease the spam vote count, but also store an individual user's corrected non-spam template. In the spam detection process, a new message that is highly similar with the receiver's non-spam template may be determined by the system as a non-spam message despite the aggregated, collective vote count.

To describe some implementations in greater detail, reference is first made to examples of hardware and software structures used to implement voicemail spam detection. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106.

Figure 2:
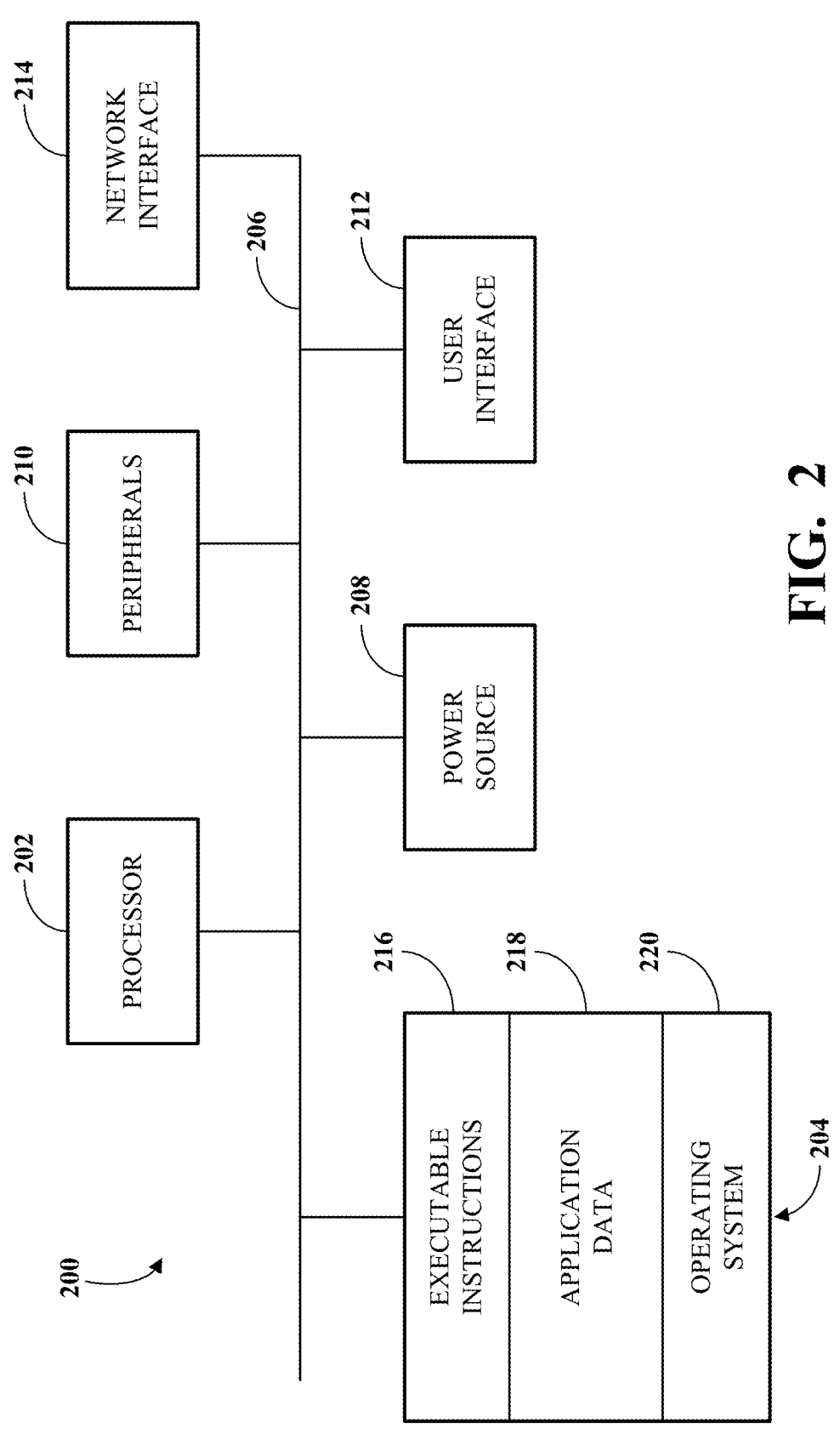
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
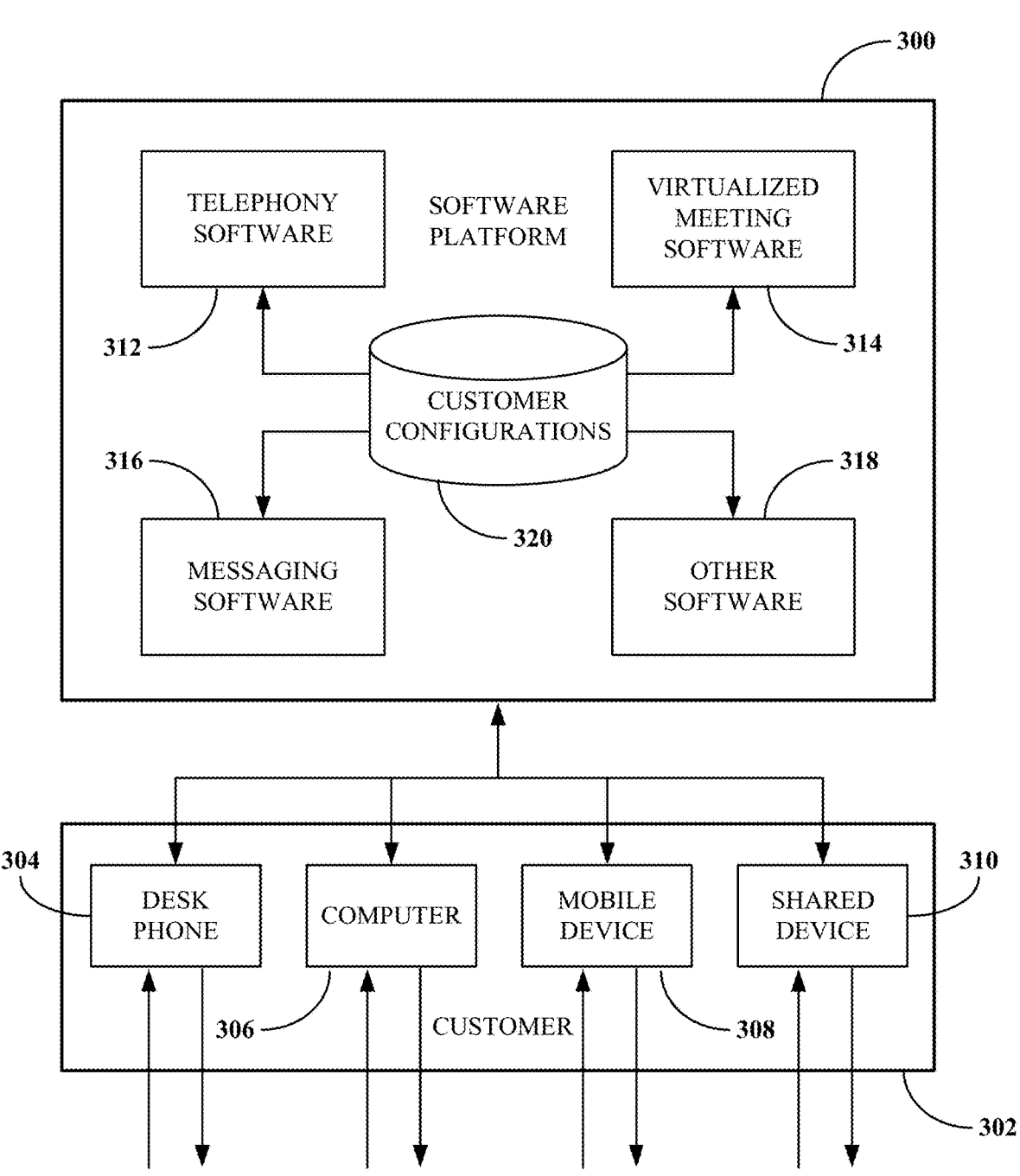
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, virtualized meeting software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. For example, the telephony software 312 may be implemented using one or more both of an application server and a telephony server, such as the application server 108 and the telephony server 112 shown in FIG. 1. Calls sent or received using the telephony software 312 may, for example, be sent or received using the desk phone 304, a softphone running on the computer 306, a mobile application running on the mobile device 308, or using the shared device 310 where same includes telephony features.

The virtualized meeting software 314 enables audio, video, and/or other forms of virtualized meetings between multiple devices, such as to facilitate a conference between the users of those devices. The virtualized meeting software 314 can include functionality for hosting, presenting, scheduling, joining, or otherwise participating in a virtualized meeting. The virtualized meeting software 314 may further include functionality for recording some or all of a virtualized meeting and/or documenting a transcript for the virtualized meeting.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a voicemail spam filter and a voicemail spam collector that maintains a list of spam templates including respective voicemail representations that can be used by the voicemail spam filter to identify incoming voicemail messages as spam.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a virtualized meeting. In yet another example, the virtualized meeting software 314 may include functionality for sending and receiving instant messages between participants and/or other users of the customer 302. In yet another example, the virtualized meeting software 314 may include functionality for file sharing between participants and/or other users of the customer 302. In some implementations, some or all of the software 312 through 318 may be combined into a single software application run on clients of the customer, such as one or more of the clients 304-310.

Figure 4:
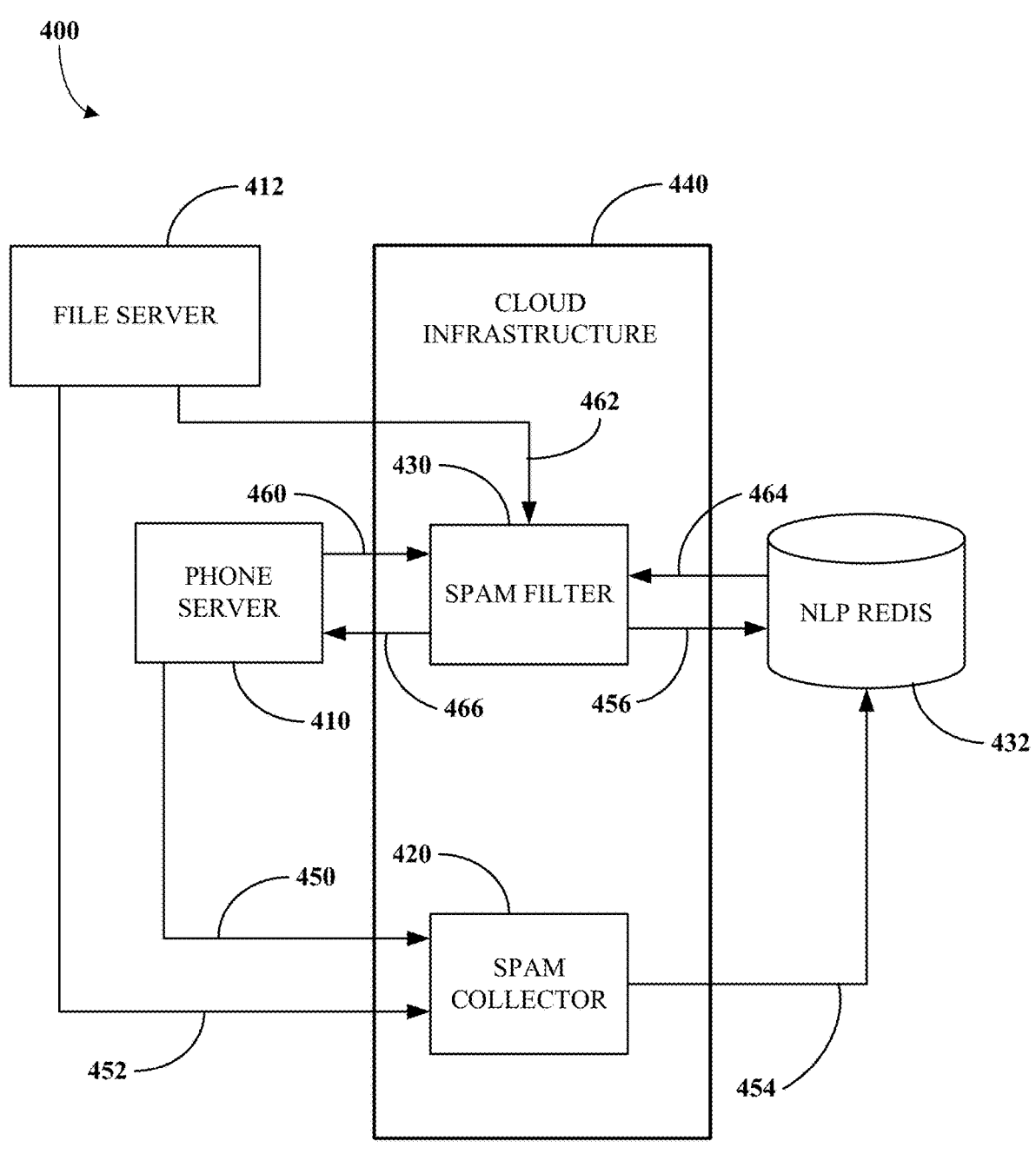
FIG. 4 is a block diagram of an example of a telephony system configured to detect spam voicemail messages.

FIG. 4 is a block diagram of an example of a telephony system 400 configured to detect spam voicemail messages. The system 400 includes a phone server 410; a file server 412; a spam collector 420; a spam filter 430; and a natural language processing (NLP) cache database Redis 432. In this example, the spam collector 420 and the and the spam filter 430 are implemented in a cloud infrastructure 440. For example, the telephony system 400 may be used to implement the technique 500 of FIG. 5. For example, the telephony system 400 may be used to implement the technique 600 of FIG. 6. For example, the telephony system 400 may be used to implement the technique 800 of FIG. 8.

For example, the phone server 410 may be the telephony server 112 of FIG. 1. The cloud infrastructure 440 may be a cloud computing infrastructure including many server devices that facilitate the on-demand execution scalable applications. For example, the cloud infrastructure 440 may include an Elastic Kubernetes Service (EKS) infrastructure.

In some implementations, the spam collector 420 and/or the spam filter 430 may be implemented using the application server 108 in the datacenter 106. For example, the spam collector 420 and the spam filter 430 may be implemented as components of the software platform 300. For example, the file server 412 may store and or control access to voicemail messages.

An example of a workflow implemented by the telephony system 400 may proceed as follows. First, the spam collector may run a job periodically (e.g., once a day) to collect user-tagged spam voicemail text. This job starts when the spam collector 420 receives 450 a user indication of spam associated with a voicemail message (e.g., a spam voicemail identifier) from the phone server 410 and also receives 452 a corresponding representation of voicemail (e.g., voicemail text) from the file server 412. Second, if the voicemail message that has been indicated as spam does not match a spam template in the spam template list, the spam collector 420 may add 454 it to the spam template list stored in the NLP cache database Redis 432. If the voicemail message matches a spam template already in the spam template list, the spam collector 420 increments a vote count for the matching spam template. For example, the spam collector 420 may implement the technique 500 of FIG. 5 to process to update and maintain the spam template list.

Later, the reception of another voicemail message at the phone server 410 or another event may trigger the analysis of the voicemail message by the spam filter 430. At that point the workflow may continue. Fifth, a new voicemail may be transcribed to text (e.g., using a speech recognition module, such as by AI Sense) and a notification of the voicemail message may be sent 460 to the spam filter 430. Sixth, the spam filter 430 may receive 462 the new voicemail text from the file server 412. Seventh, the spam filter 430 may receive 464 the spam template list from the NLP cache database Redis 432. Eighth, the spam filter 430 may match the new voicemail text with a spam template in the spam template list. If there is a match, the spam filter 430 may increment an occurrence count of the spam template and store 456 the updated occurrence count to the NLP cache database Redis 432, and the new voicemail message may be flagged as spam and/or other spam counter measures may be invoked. If not a match, the new voicemail message would not be flagged as spam. The spam filter 430 may then notify 466 (e.g., via an asynchronous message queue) the phone server 410 whether the new voicemail is flagged as spam or not. For example, the spam filter 430 may implement the technique 600 of FIG. 6 to process a new voicemail message using the spam template list.

Figure 5:
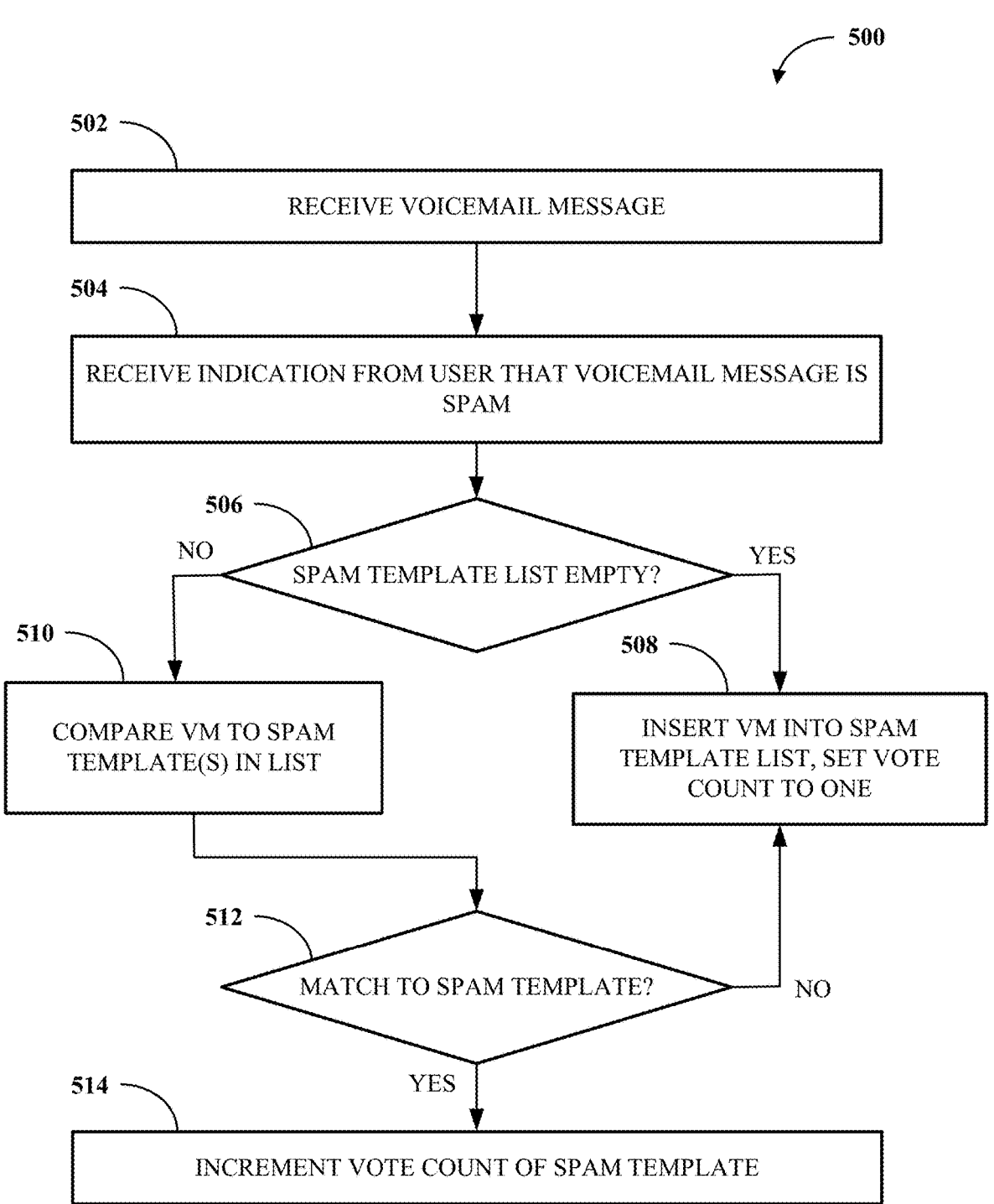
FIG. 5 is a flowchart of an example of a technique for updating a spam template list based on a user indication of a spam voicemail.
Figure 6:
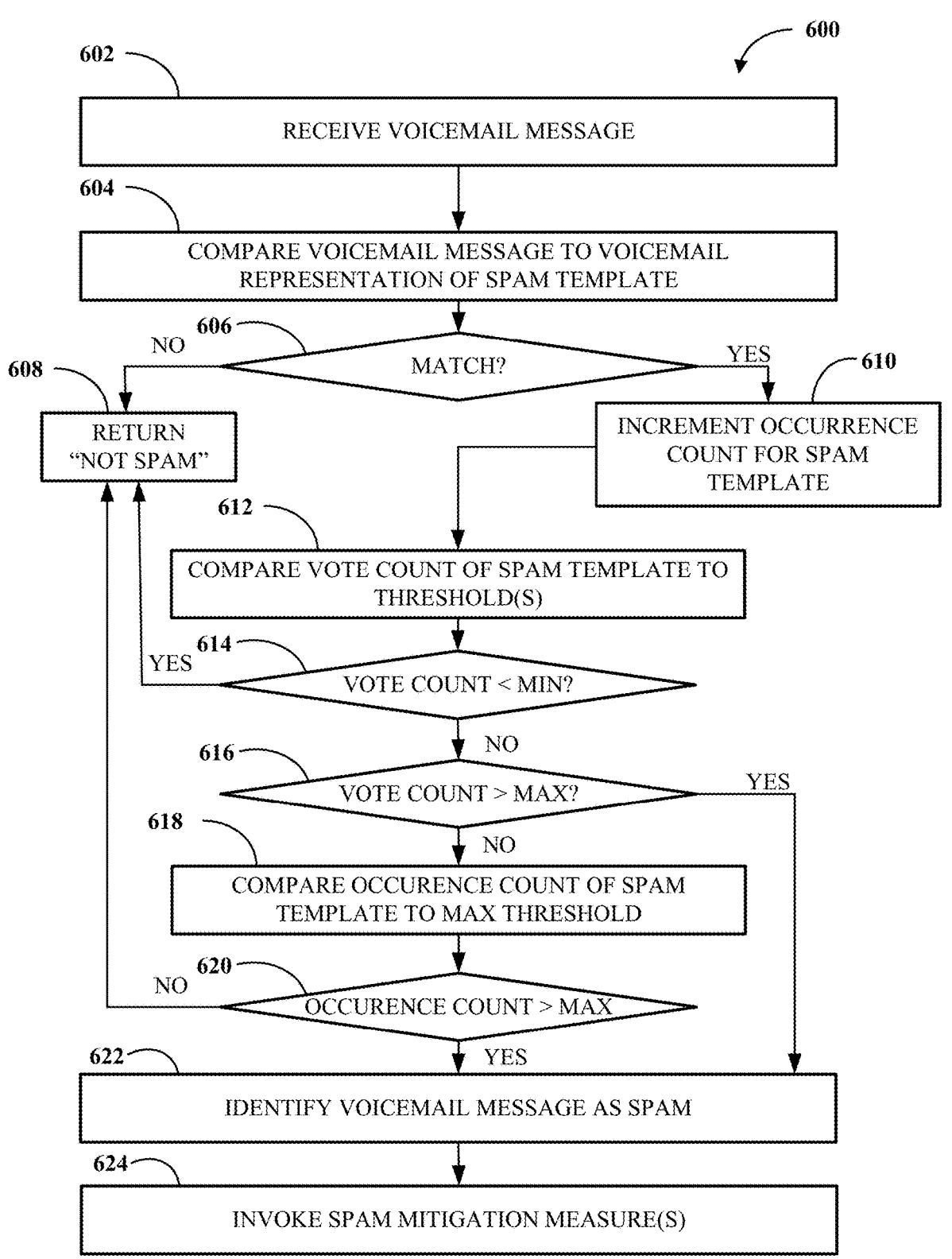
FIG. 6 is a flowchart of an example of a technique for detecting spam voicemail messages using a spam template.
Figure 7:
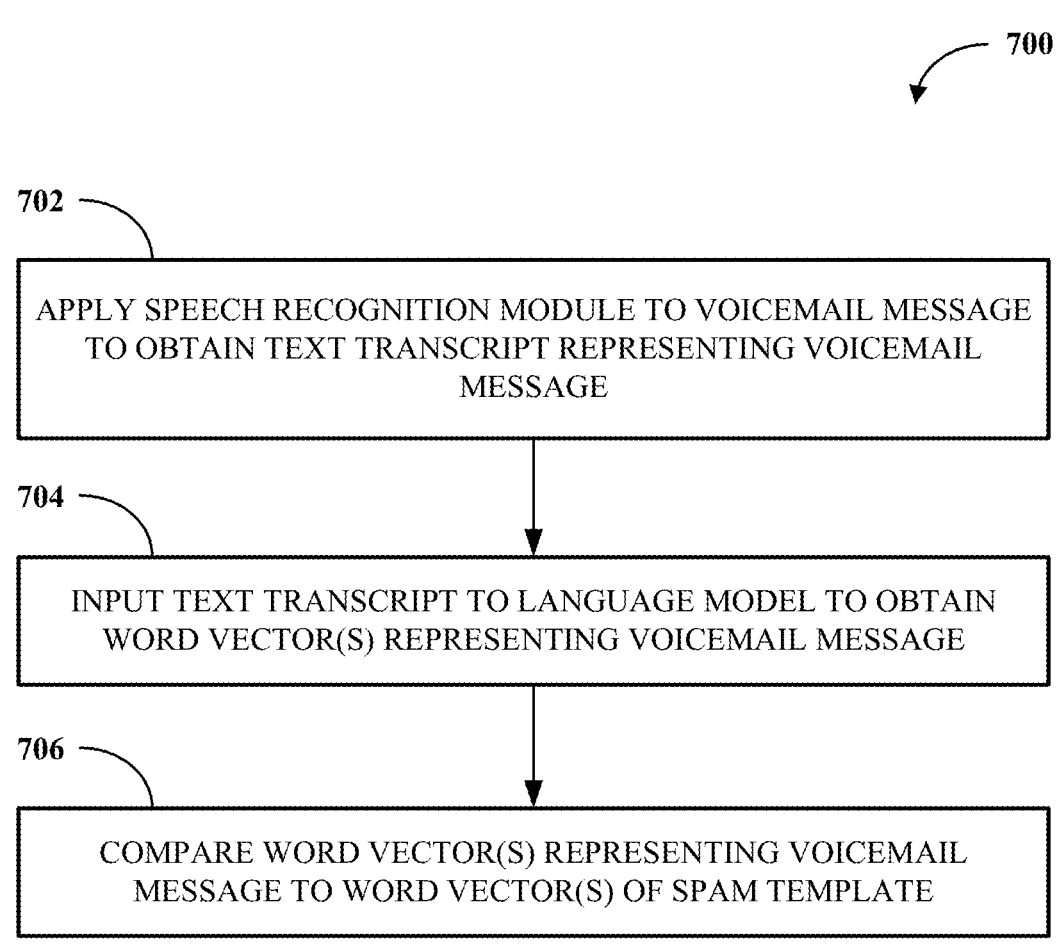
FIG. 7 is a flowchart of an example of a technique for comparing a voicemail message to a voicemail representation of a spam template.
Figure 8:
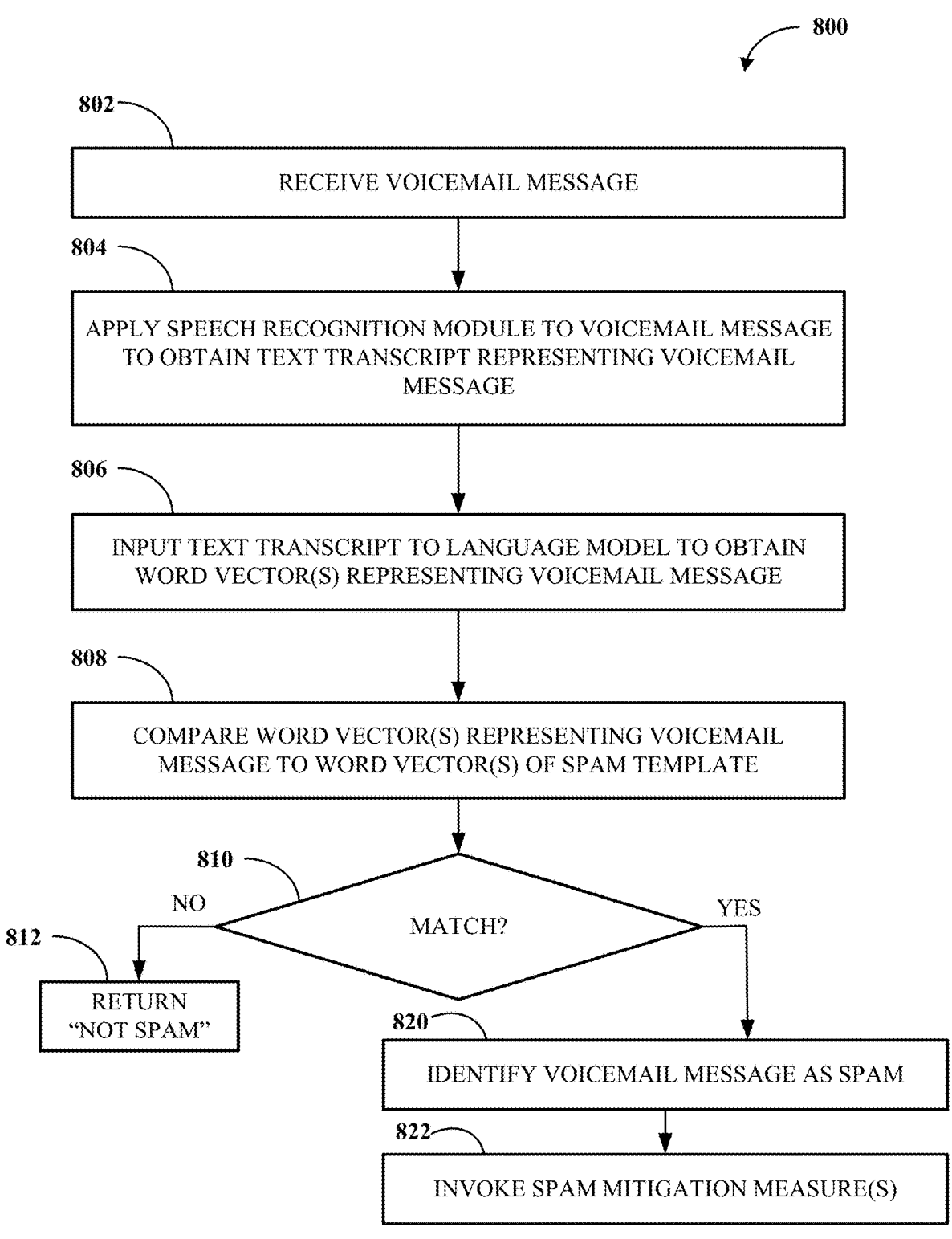
FIG. 8 is a flowchart of an example of a technique for detecting spam voicemail messages using a spam template.

To further describe implementations in greater detail, reference is next made to examples of techniques which may be performed by or using voicemail spam detection. FIG. 5 is a flowchart of an example of a technique 500 for updating a spam template list based on a user indication of a spam voicemail. FIG. 6 is a flowchart of an example of a technique 600 for detecting spam voicemail messages using a spam template. FIG. 7 is a flowchart of an example of a technique 700 for comparing a voicemail message to a voicemail representation of a spam template. FIG. 8 is a flowchart of an example of a technique 800 for detecting spam voicemail messages using a spam template.

The techniques 500, 600, 700, and/or 800 can be executed using computing devices, such as the systems, hardware, and software described with respect to FIGS. 1-4. The techniques 500, 600, 700, and/or 800 can be performed, for example, by executing a machine-readable program or other computer-executable instructions, such as routines, instructions, programs, or other code. The steps, or operations, of the techniques 500, 600, 700, and/or 800 or another technique, method, process, or algorithm described in connection with the implementations disclosed herein can be implemented directly in hardware, firmware, software executed by hardware, circuitry, or a combination thereof.

For simplicity of explanation, each of the techniques 500, 600, 700, and 800 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring to FIG. 5, the technique 500 for updating a spam template list based on a user indication of a spam voicemail is shown. At 502, the technique 500 includes receiving a voicemail message. The voicemail message may be received in a variety of formats. For example, the voicemail message may be received as an audio file from a server that stores voicemails. For example, the voicemail message may be received as a sequence of packets or frame bearing audio signals of an incoming phone call that are encoded in accordance with a compression standard (e.g., ITU-T G.711, G.723 or G.729) from a telephony device that is being used to complete call and leave a voicemail. For example, the voicemail message may be received as a file storing a transcript representing a voicemail as text including a sequence of recognized words. For example, the voicemail message may be received as a set of one or more word vectors representing the voicemail message. For example, the voicemail message may be received using a network interface (e.g., the network interface 214). For example, the voicemail message may be received from a memory (e.g. the memory 204) via a bus (e.g., the bus 206).

At 504, the technique 500 includes receiving an indication from a user that the voicemail message is spam. For example, a user, upon listening to a voicemail message or viewing a representation (e.g., a transcript) of the voicemail message may decide that the voicemail message is spam and provide an indication that the voicemail message is spam to a telephony system (e.g., of a UCaaS platform). For example, a user may click or otherwise interact with an icon in a user interface associated with the voicemail message to mark the voicemail message as spam. For example, the indication may be received via a user interface (e . . . , the user interface 212). In some implementations, the user may generate the indication at a remote device and the indication may be received using a network interface (e.g., the network interface 214). In some implementations, the user may have previously generated the indication which has been stored in a memory (e.g. the memory 204) and the indication may be received from the memory via a bus (e.g., the bus 206).

At 506, if a spam template list is empty, then, at 508, the technique 500 includes inserting a spam template into the list that includes a representation of the voicemail message. For example, the representation of the voicemail message stored in the spam template may include an audio recording of the voicemail message. For example, the representation of the voicemail message stored in the spam template may include a text transcript of the voicemail message. For example, the representation of the voicemail message stored in the spam template may include a set of one or more word vectors representing the voicemail message. At 508, a vote count for this new spam template may be set to one.

At 506, if a spam template list is not empty, then, at 510, the technique 500 includes comparing the voicemail message to a voicemail representation of a spam template in the list of spam templates. In some implementations, the voicemail message is iteratively compared to spam templates in the list of spam templates until a match is found or all of the spam templates in the list have been compared and no match is found. For example, a text transcript representation of the voicemail message may be determined and compared to a text transcript of the spam template. In some implementations, the voicemail representation of the spam template may include one or more word vectors, and comparing the voicemail message to the voicemail representation of the spam template may include applying a speech recognition module to the voicemail message to obtain a text transcript, inputting the transcript to a language model to obtain one or more word vectors representing the voicemail message, and comparing the one or more word vectors representing the voicemail message to the one or more word vectors of the spam template. For example, comparing the voicemail message to the voicemail representation of the spam template may include using the technique 700 of FIG. 7. For example, comparing the one or more word vectors representing the voicemail message to the one or more word vectors of the spam template may include determining a cosine similarity between word vectors. In some implementations, a transcript representing the voicemail message may be compared to the voicemail representation of the spam template using other algorithms, such as, for example, a dot product of vectors, a Jaccard similarity algorithm, or a longest common subsequence (LCS) algorithm. In some implementations, the voicemail representation of a spam template includes an audio recording, which may be compared directly to an audio recording of the voicemail message. For example, similarity between voicemail audio may be calculated using the audio features. For example, comparing the voicemail message to the voicemail representation of the spam template may include determining a distance metric (e.g., mean square error) between the audio recording of the spam template and an audio recording of the voicemail message. In some implementations, comparing two audio recordings may include, first, generating audio fingerprints for the audio recordings to be compared. Various algorithms can be used to generate audio fingerprints, such as, for example, Chromaprint and Echoprint. Second, a similarity score may be determined based on a bit difference between corresponding audio fingerprints. A match of the voicemail message to a voicemail representation of a spam template occurs when the comparison shows a level of similarity that meets a matching criterion (e.g., a similarity score meets a threshold).

At 512, if a match to a spam template has not been found in the list of spam templates, then, at 508, the technique 500 includes inserting a spam template that includes a representation of the voicemail message into the list of spam templates and setting a vote count for this new spam template to one.

At 512, if a match to a spam template has been found in the list of spam templates, then, at 514, the technique 500 includes, responsive to a match between the second voicemail message and the voicemail representation of the spam template, incrementing the vote count of the spam template. Incrementing a of vote count of the matching spam template may reflect that another user indication of spam for the spam template has been received.

Referring to FIG. 6, the technique 600 for detecting spam voicemail messages using a spam template is shown. At 602, the technique 600 includes receiving a voicemail message. The voicemail message may be received in a variety of formats. For example, the voicemail message may be received as an audio file from a server that stores voicemails. For example, the voicemail message may be received as a sequence of packets or frame bearing audio signals of an incoming phone call that are encoded in accordance with a compression standard (e.g., ITU-T G.711, G.723 or G.729) from a telephony device that is being used to complete call and leave a voicemail. For example, the voicemail message may be received as a file storing a transcript representing a voicemail as text including a sequence of recognized words. For example, the voicemail message may be received as a set of one or more word vectors representing the voicemail message. For example, the voicemail message may be received using a network interface (e.g., the network interface 214). For example, the voicemail message may be received from a memory (e.g. the memory 204) via a bus (e.g., the bus 206).

At 604, the technique 600 includes comparing the voicemail message to a voicemail representation of a spam template. The spam template may include the voicemail representation and a vote count that reflects a number of times that one or more users have indicated that a voicemail message matching the voicemail representation is spam. For example, the spam template may have been created and/or updated using the technique 500 of FIG. 5. For example, a text transcript representation of the voicemail message may be determined and compared to a text transcript of the spam template. In some implementations, the voicemail representation of the spam template may include one or more word vectors, and comparing the voicemail message to the voicemail representation of the spam template may include applying a speech recognition module to the voicemail message to obtain a text transcript, inputting the transcript to a language model to obtain one or more word vectors representing the voicemail message, and comparing the one or more word vectors representing the voicemail message to the one or more word vectors of the spam template. For example, comparing the voicemail message to the voicemail representation of the spam template may include using the technique 700 of FIG. 7. For example, comparing the one or more word vectors representing the voicemail message to the one or more word vectors of the spam template may include determining a cosine similarity between word vectors. In some implementations, a transcript representing the voicemail message may be compared to the voicemail representation of the spam template using other algorithms, such as, for example, a dot product of vectors, a Jaccard similarity algorithm, or a longest common subsequence (LCS) algorithm. In some implementations, the voicemail representation of the spam template includes an audio recording, which may be compared directly to an audio recording of the voicemail message. For example, comparing the voicemail message to the voicemail representation of the spam template may include determining a distance metric (e.g., mean square error) between the audio recording of the spam template and an audio recording of the voicemail message. A match of the voicemail message to a voicemail representation of a spam template occurs when the comparison shows a level of similarity that meets a matching criterion (e.g., a similarity metric meets a threshold).

At 606, if a match to a spam template has not been found, then, at 608, the technique 600 includes, returning "not spam" result for the voicemail message. In some implementations, the voicemail message is iteratively compared to multiple spam templates in the list of spam templates, by performing the technique 600 for each spam template, until a match is found or all of the spam templates in the list have been compared and no match is found. If "not spam" is the final result, the voicemail message may continue to be handled in the normal manner by the telephony system (e.g., made available in a user's voicemail inbox for the user to access).

At 606, if a match to the spam template is found, then, at 610, the technique 600 includes incrementing an occurrence count of the spam template. In this example, the spam template includes an occurrence count reflecting a number of received voicemail messages that have been matched to the voicemail representation of the spam template. The spread of highly similar message in telephony system may be correlated with spam, so keeping track of an occurrence count for a spam template may provide useful information for spam detection.

At 612, the technique 600 includes comparing a vote count of the spam template to a one or more thresholds. In this example, the vote count is compared to a maximum vote count (e.g., 100) threshold and to a minimum vote count threshold (e.g., 10). The vote count of the spam template may reflect a number of times that one or more users have provided indications that a voicemail message matching the spam template is spam. For example, the vote count of the spam count may have been updated using the technique 500 of FIG. 5. For example, the vote count of the spam count may have been updated by the spam collector 420.

At 614, if the vote count is less than the minimum vote count threshold, then, at 608, the technique 600 includes returning "not spam" result for the voicemail message.

At 614 and 616, if the vote count is between the minimum vote count threshold and the maximum vote count threshold, then, at 618, the technique 600 includes comparing the occurrence count of the spam template to a maximum threshold (e.g., 1000).

At 616, if the vote count is greater than the maximum vote count threshold, then, at 622, the technique 600 includes, responsive to a match between the voicemail message and the voicemail representation of the spam template and to the vote count exceeding the maximum threshold, identifying the voicemail message as spam. In some implementations, the order in which threshold checks at 614 and 616 are performed may be changed.

At 620, if the occurrence count does not exceed the maximum threshold, then, at 608, the technique 600 includes returning "not spam" result for the voicemail message.

At 620, if the occurrence count exceeds the maximum threshold, then, at 622, the technique 600 includes, responsive to a match between the voicemail message and the voicemail representation of the spam template and to the vote count exceeding the minimum threshold and to the occurrence count exceeding the its threshold, identifying the voicemail message as spam.

At 624, the technique 600 includes, responsive to identifying the voicemail message as spam, invoking a spam mitigation measure on the voicemail message. For example, the spam mitigation measure may include blocking the voicemail message from entering a voicemail inbox of a user. For example, the spam mitigation measure may include deleting the voicemail message. For example, the spam mitigation measure may include displaying a message in a user interface indicating that the first voicemail message is spam. For example, the user interface may be a graphical user interface (GUI) provided to a user of a telephony system via a network connection. For example, the message may include a marker on an icon corresponding to the voicemail message that indicates the voicemail message is suspected spam. In some implementations, the message is selecting from among a discrete set or range of values that respectively convey different confidence levels for the classification of the voicemail message as spam. For example, an icon for the voicemail may be color-coded with a color selected from a color spectrum based on a similarity metric (e.g., a word vector cosine similarity or an audio distance metric) that was used to identify the voicemail message as spam (e.g., red for a voicemail with high similarity to the spam template, orange for a voicemail with moderate similarity to the spam template, and yellow for a voicemail with relatively low similarity to the spam that still constitutes a match to the spam template). For example, the spam mitigation measure may be invoked by executing software with local processor (e.g., the processor 202). For example, the spam mitigation measure may be invoked by transmitting (e.g., using the network interface 214) a request or command to a remote computing device (e.g., the file server 412) to cause the remote computing device to implement the spam mitigation measure.

Referring to FIG. 7, the technique 700 for comparing a voicemail message to a voicemail representation of a spam template is shown. At 702, the technique 700 includes applying a speech recognition module to a voicemail message to obtain a text transcript representing the voicemail message. For example, the speech recognition module may use a Connectionist Temporal Classification (CTC) model or a Listen, Attend and Spell (LAS) model. The text transcript may be representation of the content of the voicemail message.

At 704, the technique 700 includes inputting the text transcript to a language model to obtain one or more word vectors representing the voicemail message. For example, the text transcript may be converted into word embedding vectors using a pre-trained machine learning model (e.g., GloVe by Stanford, using open source natural language processing (NLP) library Gensim). For example, the text transcript may include or be converted to a sequence of tokens (e.g., words). Suppose one voicemail transcript contains N tokens. For example, a token may be vectorized to obtain a corresponding word vector (e.g., a vector of dimension 300) using a pre-trained GloVe model. For example, a voicemail transcript with N tokens may result in N corresponding word vectors, with each of these word vectors having a same dimension (e.g., 300). For example, the dimension of the word vectors may be determined based on analysis of the tokens of the transcript or based on analysis of larger corpus of similar transcripts. In some implementations the voicemail message may then be represented as an N×D matrix, with N rows and D columns. The N is the number of tokens and D is the dimension of each word vector. In some implementations, an average word vector may be determined for the N×D matrix: for each column, add the elements of all rows together, then divided by N to obtain in 1×D matrix representing the voicemail message. In other words, a D dimensional vector (e.g., a vector of dimension 300 may be used to represent the content of the voicemail message.

At 706, the technique 700 includes comparing the one or more word vectors representing the voicemail message to the one or more word vectors of a spam template. The voicemail representation of the spam template includes one or more word vectors (e.g., a word embedding vector). Comparing the one or more word vectors representing the voicemail message to the one or more word vectors of the spam template may include determining a cosine similarity between word vectors. For example, the similarity between the voicemail message and the spam template may be calculated based on a cosine similarity of the embedding vectors. For example, a cosine similarity may be determined as an inner product of normalized word embedding vectors. In some implementations, to determine whether two voicemail messages match, three criteria are used: (a.) the difference of word counts of two voicemail messages is less than a configurable threshold (e.g., less than 10% difference). (b.) The ROUGE-1 score, which measures the overlap of unigrams (e.g., each word) between two representations of respective voicemail messages, has to be higher than a configurable threshold (e.g., 85% or more overlap). (c.) Cosine similarity may be used to compare two word vectors. For example, the normalized dot product of two embedding words vectors corresponding to respective voicemail messages may be compared a configurable threshold (e.g., 0.99), and a match be declared if the dot product is higher than the threshold.

Referring to FIG. 8, the technique 800 for detecting spam voicemail messages using a spam template is shown. At 802, the technique 800 includes receiving a voicemail message. The voicemail message may be received in a variety of formats. For example, the voicemail message may be received as an audio file from a server that stores voicemails. For example, the voicemail message may be received as a sequence of packets or frame bearing audio signals of an incoming phone call that are encoded in accordance with a compression standard (e.g., ITU-T G.711, G.723 or G.729) from a telephony device that is being used to complete call and leave a voicemail. For example, the voicemail message may be received as a file storing a transcript representing a voicemail as text including a sequence of recognized words. For example, the voicemail message may be received as a set of one or more word vectors representing the voicemail message. For example, the voicemail message may be received using a network interface (e.g., the network interface 214). For example, the voicemail message may be received from a memory (e.g. the memory 204) via a bus (e.g., the bus 206).

At 804, the technique 800 includes applying a speech recognition module to the voicemail message to obtain a text transcript based on the voicemail message. For example, the speech recognition module may use a Connectionist Temporal Classification (CTC) model or a Listen, Attend and Spell (LAS) model. The text transcript may be representation of the content of the voicemail message.

At 806, the technique 800 includes inputting the text transcript to a language model to obtain one or more word vectors representing the voicemail message. For example, the text transcript may be converted into word embedding vectors using a pre-trained machine learning model (e.g., GloVe by Stanford, using open source natural language processing (NLP) library Gensim).

At 808, the technique 800 includes comparing the one or more word vectors representing the voicemail message to one or more word vectors of a spam template. The spam template includes the one or more word vectors (e.g., a word embedding vector) representing a voicemail. Comparing the one or more word vectors representing the voicemail message to the one or more word vectors of the spam template may include determining a cosine similarity between word vectors. For example, the similarity between the voicemail message and the spam template may be calculated based on a cosine similarity of the embedding vectors.

At 810, if a match is not detected, then, at 812, the technique 800 includes returning "not spam" result for the voicemail message. In some implementations, the voicemail message is iteratively compared to multiple spam templates in the list of spam templates, by performing the technique 800 for each spam template, until a match is found or all of the spam templates in the list have been compared and no match is found. If "not spam" is the final result, the voicemail message may continue to be handled in the normal manner by the telephony system (e.g., made available in a user's voicemail inbox for the user to access).

At 810, if a match is detected, then, at 820, the technique 800 includes, based on the comparison of the word vectors, identifying the voicemail message as spam.

At 822, the technique 800 includes, responsive to identifying of the voicemail message as spam, invoking a spam mitigation measure on the voicemail message. For example, the spam mitigation measure may include blocking the voicemail message from entering a voicemail inbox of a user. For example, the spam mitigation measure may include deleting the voicemail message. For example, the spam mitigation measure may include displaying a message in a user interface indicating that the first voicemail message is spam. For example, the user interface may be a GUI provided to a user of a telephony system via a network connection. For example, the message may include a marker on an icon corresponding to the voicemail message that indicates the voicemail message is suspected spam. In some implementations, the message is selecting from among a discrete set or range of values that respectively convey different confidence levels for the classification of the voicemail message as spam. For example, an icon for the voicemail may be color-coded with a color selected from a color spectrum based on a similarity metric (e.g., a word vector cosine similarity or an audio fingerprint similarity score) that was used to identify the voicemail message as spam (e.g., red for a voicemail with high similarity to the spam template, orange for a voicemail with moderate similarity to the spam template, and yellow for a voicemail with relatively low similarity to the spam that still constitutes a match to the spam template). For example, the spam mitigation measure may be invoked by executing software with a local processor (e.g., the processor 202). For example, the spam mitigation measure may be invoked by transmitting (e.g., using the network interface 214) a request or command to a computing device (e.g., the client 104A or the file server 412) to cause the computing device to implement the spam mitigation measure.

In some implementations (not shown in FIG. 8), the technique 800 may be modified to include checking an occurrence count for the spam template. The spam template may also include an occurrence count reflecting a number of received voicemail messages that have been matched to the voicemail representation of the spam template. The technique 800 may be modified to include comparing the occurrence count of the spam template to a threshold (e.g. 1000). The voicemail message may be identified as spam responsive to the occurrence count exceeding the threshold.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood as a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising: determining a cosine similarity between one or more word vectors representing a voicemail message and one or more word vectors of a spam message; and responsive to the cosine similarity between the voicemail message and the spam message exceeding a threshold, identifying the voicemail message as spam, wherein the spam message is an audio recording, and wherein the cosine similarity is determined based on a distance metric between the audio recording of the spam message and an audio recording of the voicemail message.

2. The method of claim 1, wherein the spam message includes a vote count that reflects a number of times that one or more users have indicated that a second voicemail message matching the spam message is spam.

3. The method of claim 2, comprising:

comparing the vote count of the spam message to a spam threshold; and invoking a spam mitigation measure on the voicemail message when the vote count exceeds the spam threshold.

4. The method of claim 1, wherein the spam message further comprises an occurrence count reflecting a number of received voicemail messages that have been matched to the spam message, and further comprising:

comparing the occurrence count of the spam message to a second threshold, wherein the voicemail message is identified as spam responsive to the occurrence count exceeding the second threshold.

5. The method of claim 1, further comprising:

receiving an indication from a user that a second voicemail message is spam;

comparing the second voicemail message to the spam message; and responsive to a match between the second voicemail message and the spam message, incrementing a vote count of the spam message.

6. The method of claim 1, further comprising:

blocking the voicemail message from entering a voicemail inbox of a user.

7. The method of claim 1, further comprising:

deleting the voicemail message.

8. The method of claim 1, further comprising:

displaying a message in a user interface indicating that the voicemail message is spam.

9. A system, comprising: a processor, and a memory, wherein the memory stores instructions executable by the processor to: determine a cosine similarity between one or more word vectors representing a voicemail message and one or more word vectors of a spam message; and responsive to the cosine similarity between the voicemail message and the spam message exceeding a threshold, identify the voicemail message as spam, wherein the spam message is an audio recording, and wherein the cosine similarity is determined based on a distance metric between the audio recording of the spam message and an audio recording of the voicemail message.

10. The system of claim 9, wherein the spam message includes a vote count that reflects a number of times that one or more users have indicated that a second voicemail message matching the spam message is spam.

11. The system of claim 10, wherein the memory stores instructions executable by the processor to:

compare the vote count of the spam message to a spam threshold; and invoke a spam mitigation measure on the voicemail message when the vote count exceeds the spam threshold.

12. The system of claim 9, wherein the spam message further comprises an occurrence count reflecting a number of received voicemail messages that have been matched to the spam message, and wherein the memory stores instructions executable by the processor to:

compare the occurrence count of the spam message to a second threshold, wherein the voicemail message is identified as spam responsive to the occurrence count exceeding the second threshold.

13. The system of claim 9, wherein the memory stores instructions executable by the processor to:

receive an indication from a user that a second voicemail message is spam;

compare the second voicemail message to the spam message; and responsive to a match between the second voicemail message and the spam message, increment a vote count of the spam message.

14. A non-transitory computer-readable storage medium, comprising executable instructions that, when executed by a processor, facilitate performance of operations, comprising: determining a cosine similarity between one or more word vectors representing a voicemail message and one or more word vectors of a spam message; and responsive to the cosine similarity between the voicemail message and the spam message exceeding a threshold, identifying the voicemail message as spam, wherein the spam message is an audio recording, and wherein the cosine similarity is determined based on a distance metric between the audio recording of the spam message and an audio recording of the voicemail message.

15. The non-transitory computer-readable storage medium of claim 14, wherein the spam message includes a vote count that reflects a number of times that one or more users have indicated that a second voicemail message matching the spam message is spam.

16. The non-transitory computer-readable storage medium of claim 15, wherein the operations further comprise:

comparing the vote count of the spam message to a spam threshold; and invoking a spam mitigation measure on the voicemail message when the vote count exceeds the spam threshold.

17. The non-transitory computer-readable storage medium of claim 14, wherein the spam message further comprises an occurrence count reflecting a number of received voicemail messages that have been matched to the spam message, and wherein the operations further comprise:

comparing the occurrence count of the spam message to a second threshold, wherein the voicemail message is identified as spam responsive to the occurrence count exceeding the second threshold.

* * * * *